United States Patent
Henry

(10) Patent No.: US 12,254,282 B2
(45) Date of Patent: Mar. 18, 2025

(54) METHOD FOR AUTOMATICALLY MATCHING CHART NAMES

(71) Applicant: Rockwell Collins, Inc., Cedar Rapids, IA (US)

(72) Inventor: Jeff M. Henry, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 307 days.

(21) Appl. No.: 17/525,378

(22) Filed: Nov. 12, 2021

(65) Prior Publication Data

US 2023/0153064 A1     May 18, 2023

Related U.S. Application Data

(60) Provisional application No. 63/278,576, filed on Nov. 12, 2021.

(51) Int. Cl.
    *G06F 16/14*           (2019.01)
    *G06F 7/00*             (2006.01)
    *G06F 17/15*           (2006.01)

(52) U.S. Cl.
    CPC .............. *G06F 7/00* (2013.01); *G06F 16/14* (2019.01); *G06F 17/15* (2013.01); *G06F 2207/025* (2013.01)

(58) Field of Classification Search
None
See application file for complete search history.

(56) References Cited

U.S. PATENT DOCUMENTS

| | | | |
|---|---|---|---|
| 3,522,586 A | 8/1970 | Kiji et al. |
| 3,656,178 A | 4/1972 | Maine et al. |
| 4,096,527 A | 6/1978 | Furuta |
| 4,736,303 A | 4/1988 | Itoh et al. |
| 4,792,981 A | 12/1988 | Cahill, III et al. |

(Continued)

FOREIGN PATENT DOCUMENTS

| | | |
|---|---|---|
| CA | 3095088 C | 2/2021 |
| CN | 1045835 C | 10/1999 |

(Continued)

OTHER PUBLICATIONS

Extended European Search Report dated Apr. 11, 2023; European Application No. 22207049.2.

(Continued)

*Primary Examiner* — Eliyah S. Harper
(74) *Attorney, Agent, or Firm* — Suiter Swantz IP

(57) ABSTRACT

A method for correlating a first item to a second item is disclosed. The method includes detecting a first identifier associated with the first item and detecting a second identifier associated with the second item. The method further includes simplifying the first identifier, and executing a matching procedure configured to match the first identifier to the second identifier and generating a match value, which includes comparing the first identifier to the second identifier and generating the match value between the first identifier and the second identifier. The method also includes reporting a correlation between the first item and the second item based on the match value. The method may be performed by a system that includes a controller, one or more processors, and memory.

10 Claims, 9 Drawing Sheets

(56) References Cited

U.S. PATENT DOCUMENTS

| | | | |
|---|---|---|---|
| 4,876,651 A | 10/1989 | Dawson et al. | |
| 5,050,230 A | 9/1991 | Jones et al. | |
| 5,428,692 A | 6/1995 | Kuehl | |
| 5,454,076 A | 9/1995 | Cain et al. | |
| 5,499,382 A | 3/1996 | Nusinov et al. | |
| 5,537,669 A | 7/1996 | Evans et al. | |
| 5,546,572 A | 8/1996 | Seto et al. | |
| 5,559,707 A | 9/1996 | DeLorme et al. | |
| 5,577,170 A | 11/1996 | Karow | |
| 5,917,436 A * | 6/1999 | Endo | G09B 29/10 340/995.14 |
| 5,936,637 A | 8/1999 | Seto | |
| 5,978,715 A | 11/1999 | Briffe et al. | |
| 6,014,133 A | 1/2000 | Yamakado et al. | |
| 6,240,341 B1 | 5/2001 | Snyder | |
| 6,275,610 B1 | 8/2001 | Hall, Jr. et al. | |
| 6,320,984 B1 | 11/2001 | Shigeta | |
| 6,336,074 B1 * | 1/2002 | Woo | G01C 21/26 701/461 |
| 6,448,922 B1 | 9/2002 | Kelly | |
| 6,501,441 B1 | 12/2002 | Ludtke et al. | |
| 6,757,445 B1 | 6/2004 | Knopp | |
| 6,839,714 B2 | 1/2005 | Wheeler et al. | |
| 6,922,703 B1 * | 7/2005 | Snyder | G01C 23/005 707/999.104 |
| 7,039,505 B1 | 5/2006 | Southard et al. | |
| 7,096,211 B2 | 8/2006 | Fujihara | |
| 7,552,010 B2 | 6/2009 | Saito | |
| 7,552,011 B2 | 6/2009 | Ishii et al. | |
| 7,562,289 B2 | 7/2009 | Bufkin et al. | |
| 7,581,036 B2 | 8/2009 | Powell et al. | |
| 7,609,263 B2 | 10/2009 | Nagasaki et al. | |
| 7,739,622 B2 | 6/2010 | DeLine et al. | |
| 7,777,749 B2 | 8/2010 | Chung et al. | |
| 7,948,502 B2 | 5/2011 | Stanton | |
| 7,966,609 B2 | 6/2011 | Serebryany | |
| 8,035,642 B2 | 10/2011 | Suzuki | |
| 8,134,362 B1 | 3/2012 | Hullender et al. | |
| 8,165,732 B2 | 4/2012 | Corbefin et al. | |
| 8,169,505 B2 | 5/2012 | Hoshi | |
| 8,306,745 B1 | 11/2012 | Clark et al. | |
| 8,339,417 B2 | 12/2012 | Stroila et al. | |
| 8,374,390 B2 | 2/2013 | Stroila et al. | |
| 8,379,065 B2 | 2/2013 | Nam et al. | |
| 8,453,060 B2 | 5/2013 | Ofek et al. | |
| 8,515,658 B1 | 8/2013 | Foster et al. | |
| 8,583,368 B1 | 11/2013 | Sindlinger et al. | |
| 8,704,732 B2 | 4/2014 | Pourbigharaz et al. | |
| 8,799,799 B1 | 8/2014 | Cervelli et al. | |
| 8,878,872 B1 | 11/2014 | Raghu et al. | |
| 8,937,737 B2 | 1/2015 | Tsutsumi et al. | |
| 9,035,969 B2 | 5/2015 | Ivashin et al. | |
| 9,111,397 B2 | 8/2015 | Kalai et al. | |
| 9,195,637 B2 | 11/2015 | Peraza et al. | |
| 9,247,133 B2 | 1/2016 | Doepke et al. | |
| 9,430,195 B1 | 8/2016 | Pecoraro et al. | |
| 9,443,433 B1 * | 9/2016 | Conway | G08G 5/0026 |
| 9,465,513 B2 | 10/2016 | Sims | |
| 9,489,121 B2 | 11/2016 | Davis et al. | |
| 9,547,727 B2 | 1/2017 | Passani et al. | |
| 9,619,919 B1 | 4/2017 | Postnikov et al. | |
| 9,635,313 B2 | 4/2017 | Hasegawa et al. | |
| 9,639,309 B1 | 5/2017 | Pugh | |
| 9,671,935 B2 | 6/2017 | Miichi et al. | |
| 9,682,784 B1 * | 6/2017 | Wiebers | G01C 23/00 |
| 9,703,455 B2 | 7/2017 | Cocco et al. | |
| 9,781,294 B1 | 10/2017 | Chapman | |
| 9,818,051 B2 | 11/2017 | Panek et al. | |
| 9,858,823 B1 | 1/2018 | Lynn et al. | |
| 9,891,875 B2 | 2/2018 | Kim et al. | |
| 9,921,721 B2 | 3/2018 | Beavers et al. | |
| 9,939,271 B1 | 4/2018 | Foster et al. | |
| 10,001,376 B1 | 6/2018 | Tiana et al. | |
| 10,061,480 B1 | 8/2018 | McCusker et al. | |
| 10,170,010 B1 | 1/2019 | McCusker et al. | |
| 10,277,869 B2 | 4/2019 | Kim | |
| 10,297,159 B2 * | 5/2019 | Srivastav | G08G 5/0065 |
| 10,372,292 B2 | 8/2019 | Vogel et al. | |
| 10,579,187 B2 | 3/2020 | Takahashi et al. | |
| 10,598,780 B2 | 3/2020 | Bellett et al. | |
| 10,664,510 B1 | 5/2020 | Hochmuth et al. | |
| 10,674,075 B2 | 6/2020 | Kimura | |
| 10,684,769 B2 | 6/2020 | Yamat et al. | |
| 10,872,274 B2 | 12/2020 | Mao et al. | |
| 10,880,522 B2 | 12/2020 | McCutchen et al. | |
| 10,984,501 B2 | 4/2021 | Milan et al. | |
| 11,030,477 B2 | 6/2021 | Becker et al. | |
| 11,061,563 B1 | 7/2021 | Nielsen et al. | |
| 11,106,329 B2 | 8/2021 | He et al. | |
| 11,334,543 B1 * | 5/2022 | Anwar | G06F 16/254 |
| 11,885,623 B1 | 1/2024 | Goldstein | |
| 2001/0015759 A1 | 8/2001 | Squibbs | |
| 2003/0151630 A1 | 8/2003 | Kellman et al. | |
| 2004/0056883 A1 | 3/2004 | Wierowski | |
| 2004/0071351 A1 | 4/2004 | Rade | |
| 2004/0225440 A1 | 11/2004 | Khatwa et al. | |
| 2004/0225635 A1 | 11/2004 | Toyama et al. | |
| 2005/0010359 A1 * | 1/2005 | Qureshi | G01C 23/005 701/4 |
| 2005/0030321 A1 | 2/2005 | Anwar | |
| 2005/0091340 A1 | 4/2005 | Facemire et al. | |
| 2005/0264577 A1 | 12/2005 | Blais | |
| 2006/0031006 A1 | 2/2006 | Stenbock et al. | |
| 2006/0167629 A1 | 7/2006 | Ishii et al. | |
| 2006/0215915 A1 | 9/2006 | Kim | |
| 2007/0067095 A1 | 3/2007 | King | |
| 2007/0094591 A1 | 4/2007 | Etgen et al. | |
| 2007/0112517 A1 | 5/2007 | Goldstein | |
| 2007/0132767 A1 | 6/2007 | Wright et al. | |
| 2007/0185651 A1 | 8/2007 | Motoyama et al. | |
| 2007/0211151 A1 | 9/2007 | Baiping et al. | |
| 2007/0268313 A1 | 11/2007 | Dolph et al. | |
| 2008/0045138 A1 | 2/2008 | Milic-Frayling et al. | |
| 2008/0046254 A1 | 2/2008 | Nuno et al. | |
| 2008/0103641 A1 | 5/2008 | Ratcliffe | |
| 2008/0125960 A1 | 5/2008 | Wipplinger et al. | |
| 2008/0172627 A1 | 7/2008 | Hagawa et al. | |
| 2008/0192053 A1 | 8/2008 | Howell et al. | |
| 2008/0240152 A1 | 10/2008 | Quinn et al. | |
| 2009/0080801 A1 | 3/2009 | Hatfield et al. | |
| 2009/0089660 A1 | 4/2009 | Atkins et al. | |
| 2009/0123070 A1 | 5/2009 | Xiaoying | |
| 2009/0125837 A1 | 5/2009 | Hatem et al. | |
| 2009/0172035 A1 * | 7/2009 | Lessing | G06Q 30/02 |
| 2009/0210388 A1 | 8/2009 | Elson et al. | |
| 2009/0324065 A1 | 12/2009 | Ishida et al. | |
| 2010/0128020 A1 | 5/2010 | Oh et al. | |
| 2010/0185984 A1 | 7/2010 | Wright et al. | |
| 2010/0194783 A1 | 8/2010 | Kanamaru et al. | |
| 2010/0218089 A1 | 8/2010 | Chao et al. | |
| 2010/0262318 A1 | 10/2010 | Ariens | |
| 2010/0328353 A1 | 12/2010 | McDonald et al. | |
| 2011/0043539 A1 | 2/2011 | Hiroki | |
| 2011/0122153 A1 | 5/2011 | Okamura et al. | |
| 2011/0187741 A1 | 8/2011 | Akiya et al. | |
| 2011/0191014 A1 | 8/2011 | Feng et al. | |
| 2012/0010765 A1 | 1/2012 | Wilson et al. | |
| 2012/0019673 A1 | 1/2012 | Narayanan | |
| 2012/0113475 A1 | 5/2012 | Sugiyama | |
| 2012/0123680 A1 | 5/2012 | Wipplinger et al. | |
| 2012/0233542 A1 | 9/2012 | Funakoshi | |
| 2012/0242687 A1 | 9/2012 | Choi | |
| 2012/0287151 A1 | 11/2012 | James et al. | |
| 2013/0009891 A1 | 1/2013 | Watanabe et al. | |
| 2013/0159825 A1 | 6/2013 | Nishio et al. | |
| 2013/0204880 A1 * | 8/2013 | Lesiecki | G06F 16/335 707/748 |
| 2014/0104246 A1 | 4/2014 | Rao et al. | |
| 2014/0109012 A1 | 4/2014 | Choudhary et al. | |
| 2014/0168277 A1 | 6/2014 | Ashley et al. | |
| 2014/0225928 A1 | 8/2014 | Konnola et al. | |
| 2014/0229861 A1 | 8/2014 | Hellstrom | |
| 2014/0247268 A1 | 9/2014 | Drucker et al. | |
| 2014/0282038 A1 | 9/2014 | Royster et al. | |

(56) References Cited

U.S. PATENT DOCUMENTS

| | | |
|---|---|---|
| 2014/0310655 A1 | 10/2014 | Sims |
| 2014/0337816 A1 | 11/2014 | Chiluvuri |
| 2015/0070356 A1 | 3/2015 | Da Veiga et al. |
| 2015/0070373 A1 | 3/2015 | Clinton |
| 2015/0139524 A1 | 5/2015 | Choi |
| 2015/0193648 A1 | 7/2015 | Hasegawa et al. |
| 2015/0227405 A1* | 8/2015 | Jan ................ G06F 11/0778 714/37 |
| 2015/0239574 A1 | 8/2015 | Ball et al. |
| 2015/0278626 A1 | 10/2015 | Nakamura |
| 2015/0324088 A1 | 11/2015 | Pasetto et al. |
| 2015/0352952 A1 | 12/2015 | Kneuper et al. |
| 2016/0092557 A1 | 3/2016 | Stojanovic et al. |
| 2016/0293017 A1* | 10/2016 | Whelan ................ G08G 5/0091 |
| 2016/0299905 A1 | 10/2016 | Geyer et al. |
| 2017/0011064 A1 | 1/2017 | Mercer et al. |
| 2017/0046962 A1 | 2/2017 | Shipley et al. |
| 2017/0124734 A1* | 5/2017 | Gowda ................ G06T 11/20 |
| 2017/0241798 A1* | 8/2017 | Van Den Bergh ........ B64F 5/60 |
| 2017/0262413 A1 | 9/2017 | Song et al. |
| 2017/0287170 A1 | 10/2017 | Perona et al. |
| 2017/0299633 A1 | 10/2017 | Pietrowicz et al. |
| 2017/0301117 A1 | 10/2017 | Lanza |
| 2017/0301118 A1 | 10/2017 | Lanza et al. |
| 2017/0313332 A1 | 11/2017 | Paget et al. |
| 2018/0007137 A1 | 1/2018 | Watson et al. |
| 2018/0025059 A1* | 1/2018 | Batchu ................ G06F 16/215 707/740 |
| 2018/0174588 A1* | 6/2018 | Agarwal ................ G10L 15/30 |
| 2018/0181646 A1 | 6/2018 | Balasa et al. |
| 2018/0253889 A1 | 9/2018 | Nagasaka |
| 2018/0262884 A1* | 9/2018 | Hosier, Jr. ............ G06F 3/04842 |
| 2018/0301111 A1 | 10/2018 | Park et al. |
| 2018/0329927 A1 | 11/2018 | Garg et al. |
| 2019/0057671 A1 | 2/2019 | Baer et al. |
| 2019/0220234 A1 | 7/2019 | Lewis et al. |
| 2019/0237043 A1 | 8/2019 | Tahmasebi |
| 2019/0272618 A1 | 9/2019 | Boyce et al. |
| 2019/0299701 A1 | 10/2019 | Bartels |
| 2020/0013491 A1* | 1/2020 | Carter ................ G06F 16/2455 |
| 2020/0050586 A1* | 2/2020 | Pal ................ G06F 16/148 |
| 2020/0066017 A1 | 2/2020 | Kawachi et al. |
| 2020/0089694 A1 | 3/2020 | Cabra et al. |
| 2020/0097283 A1* | 3/2020 | Coccia ................ G06F 21/562 |
| 2020/0192872 A1* | 6/2020 | Quinn ................ G06F 16/24568 |
| 2020/0195924 A1 | 6/2020 | Hsiang |
| 2020/0251029 A1 | 8/2020 | Tseng |
| 2020/0252594 A1 | 8/2020 | Lee et al. |
| 2020/0255350 A1 | 8/2020 | Baek |
| 2020/0320142 A1 | 10/2020 | Malak et al. |
| 2020/0320884 A1* | 10/2020 | Hillier ................ B64C 13/18 |
| 2020/0386567 A1 | 12/2020 | Igarashi |
| 2020/0401263 A1 | 12/2020 | Chung et al. |
| 2021/0004930 A1 | 1/2021 | Kamath et al. |
| 2021/0035453 A1 | 2/2021 | Khan et al. |
| 2021/0056300 A1 | 2/2021 | Chitta et al. |
| 2021/0184758 A1 | 6/2021 | Barritt et al. |
| 2021/0192202 A1 | 6/2021 | Tripuraneni et al. |
| 2021/0206459 A1* | 7/2021 | Johnson ................ G01C 21/32 |
| 2021/0208779 A1 | 7/2021 | Nielsen et al. |
| 2021/0225181 A1 | 7/2021 | Feyereisen et al. |
| 2021/0312351 A1* | 10/2021 | Pourmohammad ... G06F 16/906 |
| 2021/0349615 A1 | 11/2021 | Ruby et al. |
| 2022/0018972 A1 | 1/2022 | Bennington et al. |
| 2022/0019238 A1 | 1/2022 | Christiansen et al. |
| 2022/0082404 A1 | 3/2022 | Barre et al. |
| 2022/0139238 A1 | 5/2022 | Teague |
| 2022/0197961 A1* | 6/2022 | Baek ................ G06N 20/00 |
| 2023/0150685 A1 | 5/2023 | Peters et al. |
| 2023/0150686 A1 | 5/2023 | Henry |
| 2023/0154338 A1 | 5/2023 | Henry et al. |
| 2023/0154341 A1 | 5/2023 | Peters et al. |
| 2023/0169625 A1 | 6/2023 | Kumar et al. |

FOREIGN PATENT DOCUMENTS

| | | |
|---|---|---|
| CN | 100440222 C | 12/2008 |
| CN | 101751449 A | 6/2010 |
| CN | 101676988 B | 12/2011 |
| CN | 102714759 B | 10/2016 |
| CN | 107026958 A | 8/2017 |
| CN | 107402734 A | 11/2017 |
| CN | 109325083 A | 2/2019 |
| CN | 110727747 A | 1/2020 |
| CN | 110906938 A | 3/2020 |
| EP | 0341645 A2 | 11/1989 |
| EP | 0380294 A1 | 8/1990 |
| EP | 0748562 A1 | 10/1998 |
| EP | 1352315 A2 | 10/2003 |
| EP | 1366462 A2 | 12/2003 |
| EP | 1454213 A2 | 9/2004 |
| EP | 1272977 B1 | 12/2004 |
| EP | 1687777 A2 | 8/2006 |
| EP | 2224359 A2 | 9/2010 |
| EP | 2792998 A2 | 10/2014 |
| EP | 2879061 A2 | 6/2015 |
| EP | 1736894 A4 | 7/2016 |
| EP | 3201879 A1 | 8/2017 |
| EP | 3538978 A4 | 8/2020 |
| EP | 3845862 A1 | 7/2021 |
| GB | 2504085 A | 1/2014 |
| JP | S622721 A | 1/1987 |
| JP | S62196772 A | 8/1987 |
| JP | S6393273 A | 4/1988 |
| JP | H05205069 A | 8/1993 |
| JP | 3871040 B2 | 1/2007 |
| JP | 2007133231 A | 5/2007 |
| JP | 2008022215 A | 1/2008 |
| JP | 4728744 B2 | 7/2011 |
| WO | 9523364 A2 | 8/1995 |
| WO | 2011036499 A1 | 3/2011 |
| WO | 2014146561 A1 | 9/2014 |
| WO | 2021035223 A1 | 2/2021 |
| WO | 2021035954 A1 | 3/2021 |

OTHER PUBLICATIONS

Extended European Search Report dated Apr. 4, 2023; European Application No. 22207012.0.
Extended European Search Report dated Apr. 5, 2023; European Application No. 22207019.5.
Hatlapatka Radim: "JBIG2 Supported by OCR", EUDML Jul. 9, 2012, pp. 1-9.
Shang Junqing et al: "JBIG2 text image compression based on OCR", Proceedings of the SPIE, vol. 6067, Jan. 15, 2006, p. 6067D.
Extended European Search Report dated Apr. 21, 2023; European Application No. 22207060.9.
Extended European Search Report dated Jun. 13, 2023; European Application No. 22206954.4.
Neupane Prasanga et al: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.
Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.
Seo et al., "Fast Contour-Tracing Algorithm Based on a Pixel-Following Method for Image Sensors", Sensors, MPDI (Year: 2016).
ArcGIS, "Introduction to export a map or layout", retrieved from the Internet Nov. 11, 2021.
Bongwon Suh, Haibin Ling, Benjamin B. Bederson, and David W. Jacobs. 2003. Automatic thumbnail cropping and its effectiveness. In Proceedings of the 16th annual ACM symposium on User interface software and technology (UIST 03). Association for Computing Machinery, New York, NY, USA, 95-104.

(56) References Cited

OTHER PUBLICATIONS

Houston, Ben & Nielsen, Michael & Batty, Christopher & Nilsson, Ola & Museth, Ken. (2006). Hierarchical RLE Level Set: A compact and versatile deformable surface representation. ACM Trans. Graph.. 25. 151-175.
Jeppesen, "JeppView for Windows, User Guide", (2016), 92 pages.
Lufthanasa Systems Blog, "Lido eRouteManual 4.3 Design Overview", (2016) Retrieved from the Internet.
Maptiler, "Software performs Geocoding, Place name search, and Reverse Geocoding." Retrieved from Internet on Nov. 11, 2021.
Microsoft, "Generate a thumbnail sprite with Azure Media Services", (2021), Retrieved from Internet Nov. 11, 2021.
Narkive Mailinglist Archive, "Fastest Method of Drawing a TileMap", (2002), Retrieved from Internet Nov. 11, 2021.
Navigraph, "Navigraph Charts", Retrieved from the Internet.
Pamental, Jason, "Digging in to dynamic typography", Retrieved from Internet, Nov. 11, 2021, 11 pages.
Pamental, Jason, "The evolution of typography with variable fonts", Retrieved from the Internet, Nov. 11, 2021.
Penquerch, "[AD] RLE clipping speedup patch" (2002), Retrieved from Internet, Nov. 11, 2021.
QGIS: Open-source cross-platform GIS software, Retrieved from Internet, Nov. 11, 2021.
Somasundaram, K. "A Method for Filling Holes in Objects of Medical Images Using Region Labeling and Run Length Encoding Schemes." (2010).
Anonymous: "Pilot's Guide to Foreflight Mobile 82nd Edition Covers ForeFlight Mobile v12.7", Aug. 26, 2020, pp. 161-165.
Anonymous: Pilot's Guide to Foreflight Mobile 82nd Edition Covers ForeFlight Mobile v12.7, Aug. 26, 2020, pp. 78-90.
Extended European Search Report dated Apr. 5, 2023, European Application No. 22207025.2.
Extended European Search Report dated Apr. 5, 2023, European Application No. 22207047.6.
Extended European Search Report dated Apr. 5, 2023; European Application No. 22207057.5.
Anonymous: "SkyDemon Mobile, GBS handheld navigation devices for aircrfaft", Dec. 4, 2021; Internet URL https://web.archive.org/web/20211204140934/https://www.skydemon.aero/inflight/.
C. Pschierer et al., "Human factors analysis for a 2D enroute moving map application", SPIE, PO Box 10, Bellingham, WA 98227-0010 USA, vol. 5802, May 25, 2005.
Extended European Search Report dated Apr. 11, 2023; European Application No. 22207123.5.
Extended European Search Report dated Apr. 12, 2023; European Application No. 22207050.0.
Extended European Search Report dated Apr. 12, 2023; European Application No. 22207124.3.
Extended European Search Report dated Apr. 18, 2023; European Application No. 22207164.9.
Rockwell Collins: "Flight Database Services for Pro Line Fusion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?la=en&lastupdate=20210125195039&csrt=15271691716207860418, p. 5.
Skysectionals: "Tour Low-Altitute Enroute Charts", Sep. 22, 2021; XP093035866, Internet: URL:https://web.archive.org/web/20210922184910/https://skysectionals.com/tour-enroute/.
Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. vol. 2, pp. 13_D_1_1_13_D_1_9, XP010669024.
Schouten, Tjeerd, Real time EFIS vector graphics, Bit Barrel Media, available at https://bitbarrelmedia.wordpress.com/2017/11/01/real-time-efis-vector-graphics/ (Nov. 11, 2017).
IDR Solutions, "How to Convert PDF to SVG in 1 minute," http://www.youtube.com/watch?v=VoyjqGIrHGk, Mar. 17, 2021.
IFR Enroute Aeronautical Charts and Planning, Federal Aviation Administration (FAA), available at https://web.archive.org/web/20211025202857/https://www.faa.gov/air_traffic/flight_info/aeronav/digital_products/ifr/ (archived Oct. 25, 2017).

\* cited by examiner

| FMS Procedure Name | Actual Chart Name to be Matched |
|---|---|
| G10RZ | RNAV_(GPS)_Z_RWY_10R |
| BDF7 | BRADFORD_SEVEN |
| OXI8 | KNOX_EIGHT |
| GSB3 | SEYMOUR_DEP |
| BAXI3M | RNAV_GNSS_DMEDME_SID_RWY_07_09_21_BAXIR_J_M_Q ... |

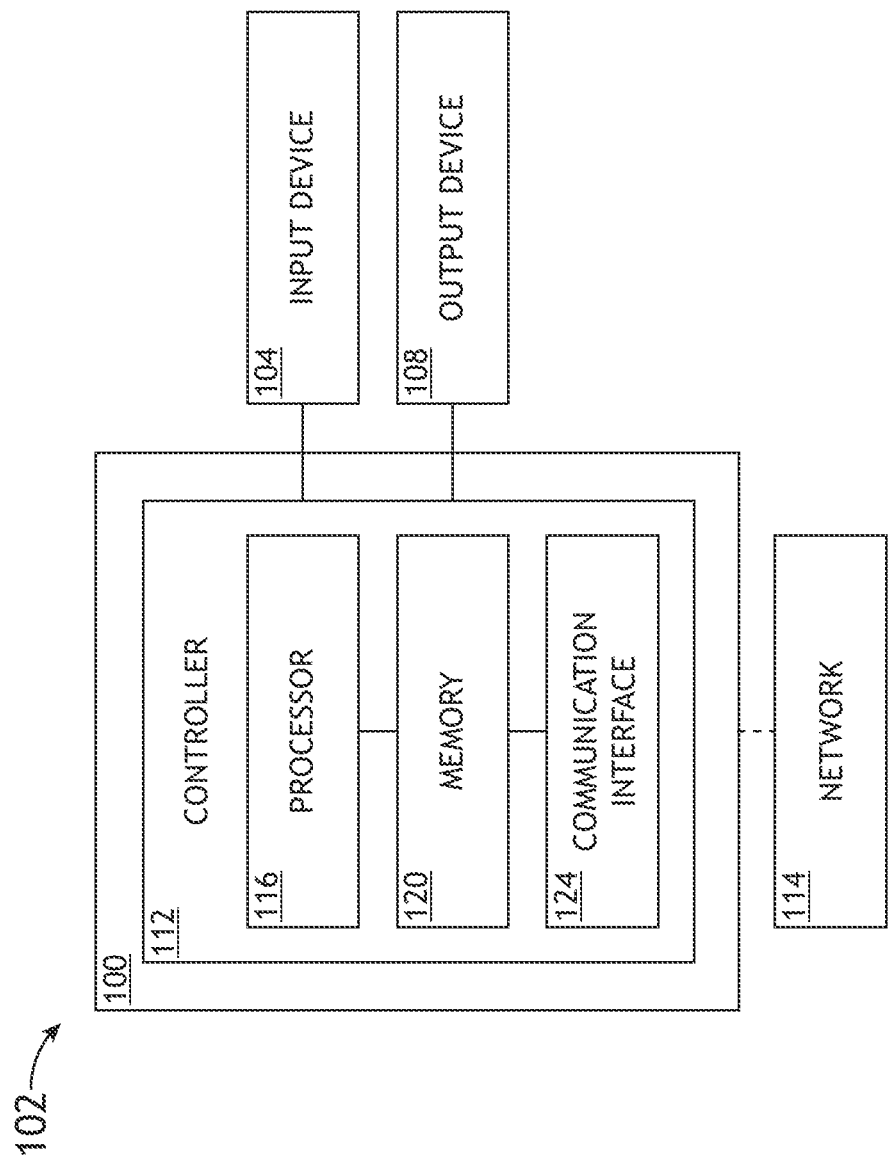

500

0) Guidance
1) Moniker
2) Incomplete
3) High Airway
4) Unused
5) RNP
6) GPS or GNSS
7) ILS
8) LOC
9) NDB
10) VOR
11) Tacan
12) DME
13) LDA
14) SDF
15) Unused
16) Unused
17) Unused
18) Unused
19) Unused
20) X
21) Y
22) Z
23) Right
24) Center
25) Left
26) Unused
27) Unused
28) SID
29) STAR
30 - 31 Continued bits:
(0=not continued,
1=1st Page when continued,
2=2nd Page,
3=3rd Page

| 1st Letter | Codex Bit(s) |
|---|---|
| I | ILS |
| V | VOR |
| S | VOR |
| E | VOR |
| D | VOR and DME |
| N | NDB |
| Q | NDB |
| F | NDB |
| L | LOC |
| B | LOC |
| G | GPS |
| R | RNP |
| T | Tacan |
| X | LDA |
| Y | SDF |

| Procedure Letter | Codex Bit(s) |
|---|---|
| X | X |
| Y | Y |
| Z | Z |
| H | Hi Airways |
| R | Right |
| L | Left |
| C | Center |

FIG.8

METHOD FOR AUTOMATICALLY MATCHING CHART NAMES

CROSS-REFERENCE TO RELATED APPLICATIONS

The present application is related to and claims the benefit of the earliest available effective filing dates from the following listed applications (the "Related applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related applications).

RELATED APPLICATIONS

U.S. Provisional Patent Application Ser. No. 63/278,576 entitled SYSTEMS AND METHODS FOR GENERATION, SELECTION, AND DISPLAY OF MAP-BASED CHART DATABASES FOR USE WITH CERTIFIED AVIONICS SYSTEMS and filed Nov. 12, 2021;

Concurrently filed U.S. Patent Application Ser. No. 17/525,659 entitled TOOL TO FACILITATE CUSTOMER GENERATED CHART DATABASES FOR USE WITH A CERTIFIED AVIONICS SYSTEM; and Concurrently filed U.S. Patent Application Ser. No. 17/525,690 entitled ELECTRONIC CHART APPLICATION WITH ENHANCED ELEMENT SEARCHING AND HIGHLIGHTING USING GENERIC THIRD-PARTY DATA.

BACKGROUND

Aircraft pilots undergo periods of high workload at specific time points in flight. Flight procedures, particularly flight procedures relating to navigation, can be particularly cognitively taxing. These procedures initially require the pilot to upload a navigation chart upon a display, such as a display on a flight management system (FMS), that is specific for the procedure.

Uploading and displaying aircraft navigation charts based upon specific navigation procedures can be particularly troublesome and time-consuming. Navigation charts are available from several vendors, with some vendors offering tens of thousands of different navigation charts, which must be matched to thousands of procedural names. Navigation chart names may be short/abbreviated descriptions of the chart or chart characteristics, or may have many (e.g., ~90) characters, and it is often not obvious to a pilot whether a specific navigation chart is relevant to the navigation procedure. Similarly, procedure names are often short/abbreviated descriptions of the of the procedure or a characteristic of the procedure. For example, a procedure name may include the designation of a specific runway of an airport for landing. These abbreviated procedure names and associated chart names often do not match in an immediately meaningful manner. To illustrate this, a chart 90 comparing a sampling of FMS procedure names with corresponding navigation chart names is shown in FIG. 1A.

Although some vendors insert a match code into a navigation chart that matches the procedure to the correct navigation chart, there are vendors that do not offer matching services, and physically matching large numbers of navigation charts to navigation procedures is labor and cost intensive. Accordingly, it would be advantageous to provide a system and method that overcomes the shortcomings described above.

SUMMARY

A method for correlating a first item to a second item is disclosed. In one or more embodiments, the method includes detecting a first identifier associated with the first item. In one or more embodiments, the method further includes detecting a second identifier associated with the second item. In one or more embodiments, the method further includes executing a matching procedure configured to match the first simplified identifier to the second identifier and generate a match value. In one or more embodiments, the method further includes comparing the first simplified identifier to the second identifier. In one or more embodiments, the method further includes generating the match value between the first simplified identifier and the second identifier. In one or more embodiments, the method further includes reporting a correlation between the first item and the second item based on the match value.

In some embodiments, simplifying the first identifier, includes generating a codex string configured as character string based on the first identifier. In some embodiments, simplifying the first identifier includes generating a codex value configured as a bit field based on the first identifier. In some embodiments, simplifying the first identifier includes removing nonessential letters. In some embodiments, simplifying the first identifier includes setting one or more bits of the codex value based on the first identifier. In some embodiments, simplifying the first identifier i includes adding one or more sub-strings of the first identifier to the codex string.

In some embodiments, executing a matching procedure configured to match the first identifier to the second identifier and generate a match value further includes determining a second identifier type of the second identifier. In some embodiments, executing a matching procedure configured to match the first identifier to the second identifier and generate a match value further includes comparing bits in the codex value and values in the codex string to the second identifier. In some embodiments, executing a matching procedure configured to match the first identifier to the second identifier and generate a match value further includes generating a match value based on the comparison between the first identifier and the second identifier.

In some embodiments of the method, the first item and the second item are configured as electronic files.

In some embodiments of the method the first item is configured as a chart, and the second item is configured as a procedure.

In some embodiments of the method, the codex string includes at least one of a moniker name, a procedure name, or a geographic location.

In some embodiments of the method, the geographical location includes a runway number.

In some embodiments of the method, simplifying the first identifier is performed in a non-mobile computing environment, wherein executing the matching procedure is performed in a mobile computing environment.

In some embodiments of the method, the codex value includes a least one of an equipment type or document characteristic.

In some embodiments of the method, the second identifier is configured as a second simplified identifier.

A system is disclosed. In one or more embodiments, the system includes a controller configured to correlating a first item to a second item. In one or more embodiments, the controller includes one or more processors. In one or more embodiments, the controller further includes a memory configured to store data and instructions executable by the one or more processors. In one or more embodiments, the instructions include detecting a first identifier associated with the first item. In one or more embodiments, the instructions further include detecting a second identifier associated with the second item. In one or more embodiments, the instructions further include executing a matching procedure configured to match the first identifier to the second identifier and generating a match value. In one or more embodiments, executing a matching procedure includes comparing the first identifier to the second identifier. In one or more embodiments, executing a matching procedure further includes generating the match value between the first identifier and the second identifier. In one or more embodiments, the instructions further include reporting a correlation between the first item and the second item based on the match value.

In some embodiments of the system, the instructions further include simplifying the first identifier In some embodiments of the system, simplifying the first identifier includes generating a codex string configured as character string based on the first identifier. In some embodiments of the system, simplifying the first identifier includes generating a codex value based on the first identifier. In some embodiments of the system, simplifying the first identifier includes removing nonessential letters. In some embodiments of the system simplifying the first identifier includes setting one or more bits of the codex value based on the first identifier. In some embodiments of the system, simplifying the first identifier includes adding one or more sub-strings of the first identifier to the codex string.

In some embodiments of the system, executing a matching procedure includes determining a second identifier type of the second identifier. In some embodiments of the system, executing a matching procedure further includes comparing bits in the codex value and values in the codex string to the second identifier. In some embodiments of the system, executing a matching procedure further includes generating a match value based on the comparison between the first simplified identifier and the second identifier.

In some embodiments of the system, wherein the first item and the second item are configured as electronic files.

In some embodiments of the system, the first item is configured as a chart, and the second item is configured as a procedure.

In some embodiments of the system, the second identifier is simplified.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1A is a chart comparing FMS procedure names with corresponding chart names;

FIG. 1B is a block diagram of a system 100 within a computing environment 102 configured to facilitate the matching of a first item to a second item, in accordance with one or more embodiments of the disclosure;

FIG. 5 is a chart illustrating an example of a codex value, in accordance with one or more embodiments of the disclosure;

FIG. 8 is a chart illustrating a list of codex value bits and corresponding $1^{st}$ letter of a procedure name, in accordance with one or more embodiments of the disclosure.

DETAILED DESCRIPTION

Figure 2:
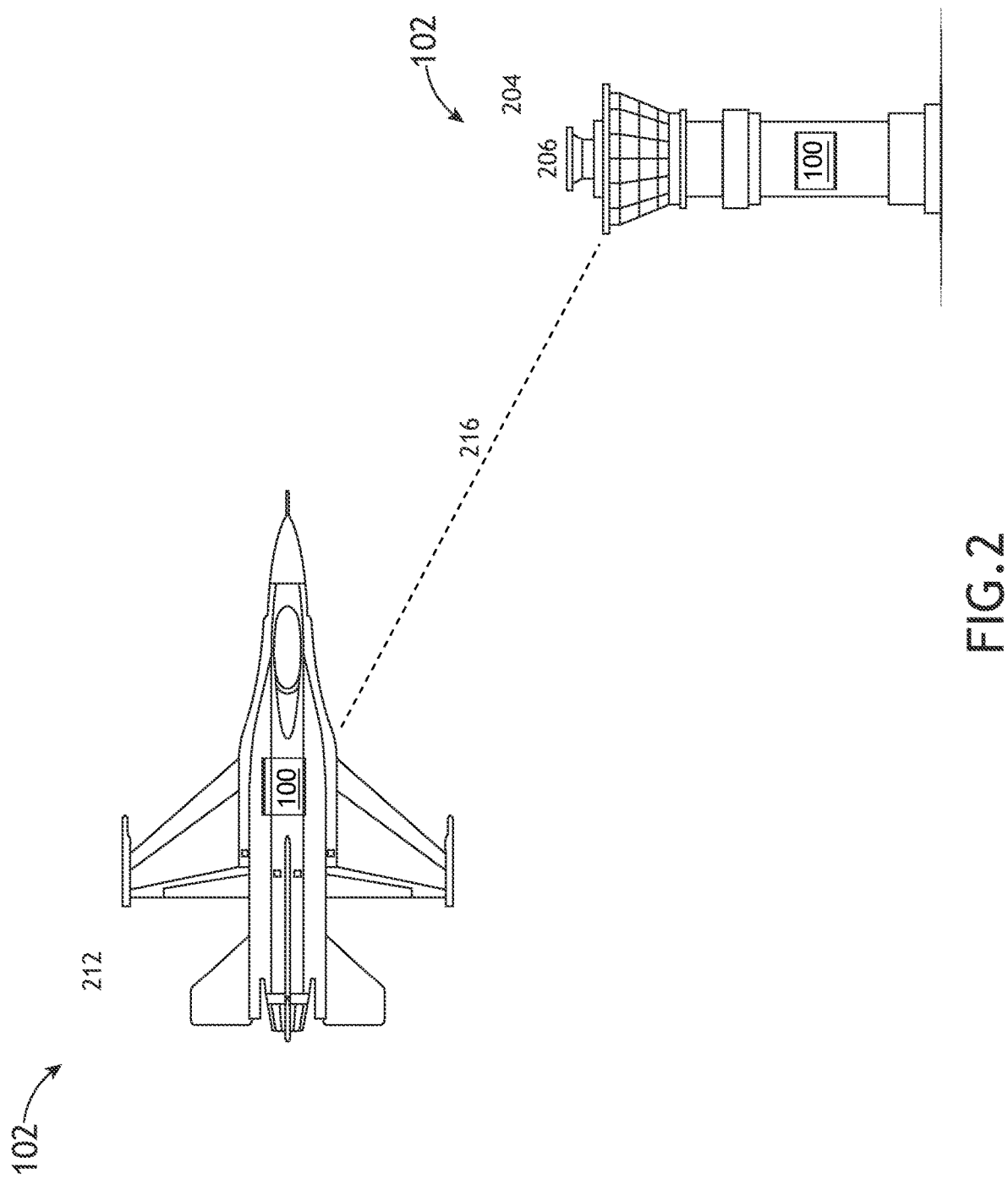
FIG. 2 is a drawing diagram illustrating a computing environment for a system comprising an aircraft and an air traffic control tower in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for matching procedure names with associated chart names are presented. The method includes simplifying the chart name, then performing a name-matching procedure. The method reports to a user, such as a pilot, a chart name, or a list of chart names, that most likely matches the chart associated with a procedure. The method greatly simplifies the arduous process of matching a chart name with a FMS procedure, as the digital representation of paper charts used in navigation come from different sources with differing or no standards (e.g., Federal Aviation Administration (FAA) Department of Defense (DOD), foreign governments, independent contractors). FMS procedure names are also difficult to predict, as FMS procedure names follow a general pattern, but do not follow a precise standard. The method to associate these names is innovative. Off-line, the chart names are parsed and certain data is stored. At run time, this data is used in a series of comparisons against the procedure name, airport identifier, procedure type, and other information to find match candidates. Additional comparisons increase the likelihood that those candidates are valid matches. A high-probability match or set of matches is presented to the pilot, reducing the time needed to select a chart.

FIG. 1B is a block diagram of a system 100 within a computing environment 102 configured to facilitate the matching of a first item to a second item, in accordance with one or more embodiments of the disclosure. The first item and the second item may each include any type of file, document, list, chart, procedure, or any named entity wherein the name or identifier of the first item is to be associated with a name or identifier of the second item. For example, the first item may be configured as a chart with a first identifier (e.g., an FMS navigation chart configured with a chart name), and the second item may be configured as procedure with a second identifier (e.g., a specifically-named landing procedure). In another example, the first item may be configured as a text file that includes a first identifier configured as a short filename (e.g., SFN or 8.3 filename) and the second item may be configured as a spreadsheet file configured with a list of second identifiers (e.g., a column of named entries), one of which is the second identifier that is associated with the first item. In another example, the first item and second item may be configured as associated text files (e.g., user manuals for a vacuum cleaner) with the text and identifiers of the first item and the second item each written in different languages.

The system 102 may be configured as a stand-alone monolithic processing device, or as a component or module within a larger computing framework. For example, one or more components of the system 102 may be configured as a component or tool within a toolkit for displaying graphics. For instance, in some embodiments, the system 102 is incorporated within the Electronic Charts Application Tool Suite (ECATS) toolkit as described in U.S. Provisional Patent Application Ser. No. 63/278,576 entitled SYSTEMS AND METHODS FOR GENERATION, SELECTION, AND DISPLAY OF MAP-BASED CHART DATABASES FOR USE WITH CERTIFIED AVIONICS SYSTEMS and filed Nov. 12, 2021, which is incorporated by referenced in its entirety. The system 100 may also be configured as a multi-component system, as shown in FIG. 2. For example, the initial processing of the first identifier and/or the second identifier may be accomplished off-line in a separate system 100 or system component than the matching of the first identifier and second identifier. For instance, the system 100 may perform initial processing may in a non-mobile computing environment 204 (e.g., in an air traffic control tower 206 or other building), whereas the matching may be performed on a mobile computing environment 208 on-board an aircraft 212 (e.g., a mobile computing environment). Data from the initial processing may be physically inputted onto the aircraft 212 via a technician while the aircraft 212 is in service, or may be sent directly via a wireless signal 216. Performing initial processing off-line and performing matching at run-time saves computing space at run-time and allows quicker response to the pilot when compared to performing both initial processing and matching at run-time. Referring back to FIG. 1B, the system 100 and/or the computing environment 102 may include an input device 104, an output device 108. The system 100 further includes a controller 112 configured to facilitate the functions of the system 100. The controller may also be coupled to the input device 104 and the output device 108, as well as to a network 114.

In embodiments, the input device 104 inputs first item data, including first identifier data, and second item data, including second identifier data, into the system 100. The input device 104 may be configured as any type of input device including but not limited to a keyboard, a scanner, a camera, or data port. For example, the input device 104 may be configured as a scanner configured to scan a graphic or list (e.g., a graphic or list of a physical avionics chart) into the system. In another example, the input device 104 may be configured as a USB port configured to receive a USB memory device having avionics charts (e.g., a digital navigation chart of a flight management system (FMS)) or avionic chart names loaded onto it (e.g., as a pdf. file, jpg. file, text file, or other type of file). In another example, the input device 104 may include a data port configured to receive data from the network 114.

In embodiments, the output device 108 may be configured to report matching data and/or output candidate first items from the system 100 to a user and may be configured as any type of output device 108 including but not limited to a display, a printer, or any type of data port. For example, the output device 108 may be configured as a computer screen. In another example, the output device 108 may be configured as a data port connected to the network 114.

In embodiments, the controller 112 includes one or more processors 116, a memory 120, and a communication interface 124. The one or more processors 116 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory 120 can be an example of tangible, computer-readable storage medium that provides storage functionality to store various data and/or program code associated with operation of the controller 112 and/or other components of the system 100, such as software programs and/or code segments, or other data to instruct the controller and/or other components to perform the functionality described herein. Thus, the memory can store data, such as a program of instructions for operating the system 100 or other components. It should be noted that while a single memory 120 is described, a wide variety of types and combinations of memory 120 (e.g., tangible, non-transitory memory) can be employed. The memory can be integral with the controller, can comprise stand-alone memory, or can be a combination of both. Some examples of the memory 120 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 124 can be operatively configured to communicate with components of the controller 112 and other components of the system 100. For example, the communication interface 124 can be configured to retrieve data from the controller 112 or other components, transmit data for storage in the memory 120, retrieve data from storage in the memory 120, and so forth. The communication interface 124 can also be communicatively coupled with controller 112 and/or system elements to facilitate data transfer between system components.

Figure 3:
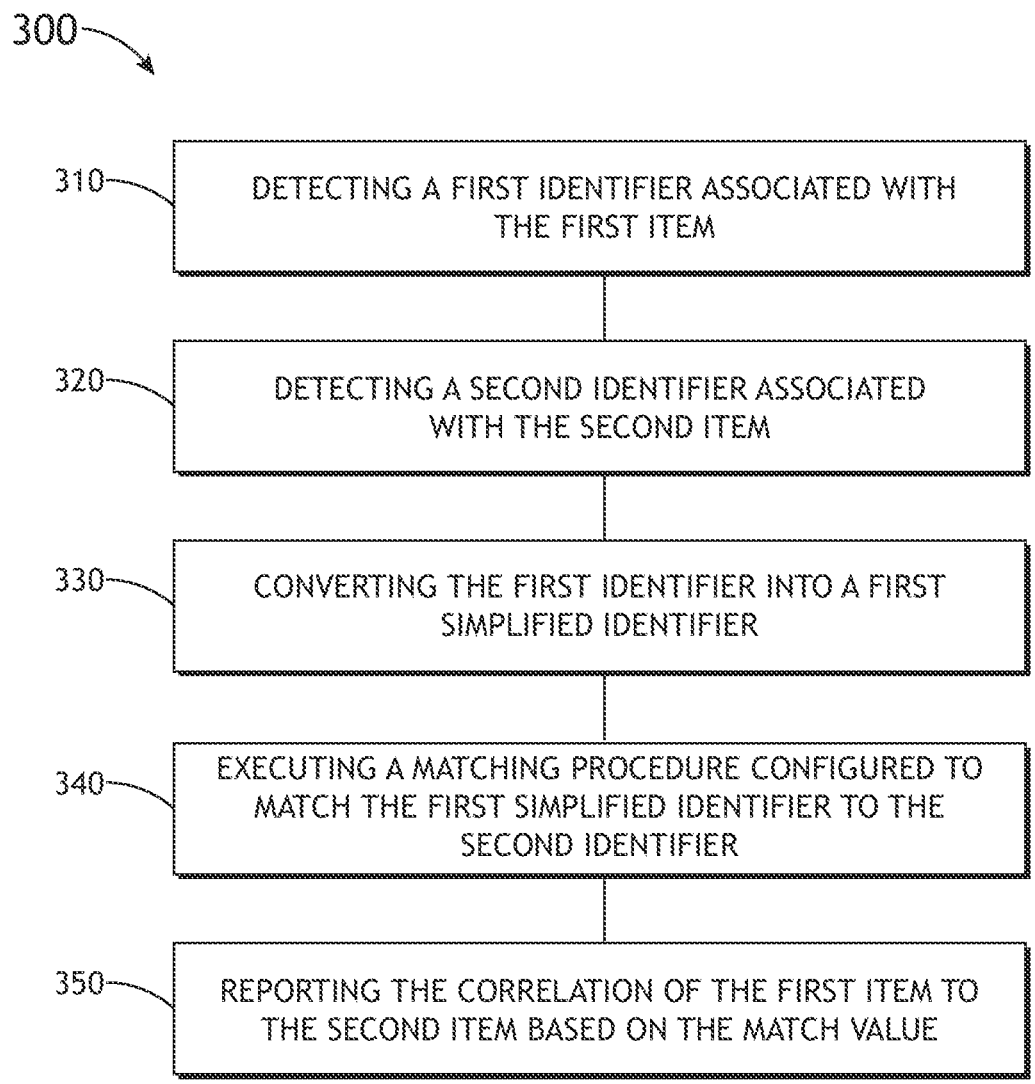
FIG. 3 is a flow diagram illustrating a method for correlating a first item to a second item, in accordance with one or more embodiments of the disclosure.

FIG. 3 is a flow diagram illustrating a method 300 for correlating a first item to a second item, in accordance with one or more embodiments of the disclosure. The first item and the second item may include the navigation chart and the FMS procedure, respectively, or may include any other first item or second item as detailed above.

In embodiments, the method 300 includes a step 310 of detecting the first identifier associated with the first item. For example, the first identifier may be configured as the name of a file. In another example, the first identifier may be configured as a title of a document, a digital object identifier (DOI), data from the citation of a document (e.g., issue number, volume number and/or page number), or any text within the document. (For instance, the first identifier may be one entry of a list of entries in a spreadsheet. A first item may be configured with two or more data pieces within the first identifier. For example, a digitized document may have two or more identifiers (e.g., a file name, and a title name) that together comprise the first identifier In embodiments, the method 300 includes a step 320 of detecting a second identifier associated with the second item. The second identifier of the second item may include any data type as indicated for the first identifier of the first item, and vice versa. For example, the second identifier may be configured as a name that identifies a procedure file or the procedure itself. For instance, the second identifier may be configured to identify an FMS procedure. A second item may be configured with two or more data pieces within the second identifier. For example, a digitized document may have two or more identifiers (e.g., a file name, and a title name) that together comprise the second identifier In some embodiments, the method 300 includes a step 330 of converting the first identifier into a first simplified identifier. Converting the first identifier into a first simplified identifier facilitates downstream matching with the second identifier. First identifier simplification may be performed off-line through software tools (e.g., as indicated in FIG. 2), via one or more processors 116, and involves the conversion of the first identifier into one or more data and/or data field types. For example, first identifier simplification may include detecting first identifier data and converting that the detected first identifier data into a Codex Value, configured as a bit field, and a Codex String, configured as a character string. Other data relating to the item type and item description/name may also be stored in memory 120. Details for converting the first identifier into the first simplified identifier are detailed below. In some embodiments, step 330 is optional, or performed to a modest extent. For example, a system 100 (e.g., such as on-board an aircraft 212) may perform the matching process between the first identifier and the second identifier with no simplification. For instance, the first identifier may be simplified to begin with to a point where the system 100 can perform the matching process without requiring further simplification. Therefore, a first identifier may be configured as a first simplified identifier, and a first simplified identifier may be configured as a first identifier.

In some embodiments, the method 300 includes a step 340 of executing a matching procedure configured to match the first simplified identifier to the second identifier, in accordance with one or more embodiments of the disclosure. The matching procedure may be performed on the aircraft 212 at run-time, as shown in FIG. 2. For example, the one or more processors 116 of the system 100 located on the aircraft 212 may compare the first simplified identifier to the second identifier, and then generate a match value between the first identifier and the second identifier. The match value is an indicator of the amount of match between the first simplified identifier and the second simplifier, and is indicative of a probability that the second item is correlative to the first item. Details of the matching procedure are detailed below.

In some embodiments, the method 300 includes a step 350 of reporting the correlation of the first item to the second item based on the match value. Based on the number of potential or probable matches and the level of matching between the first simplified identifier and the second identifier, a determination is made on whether the most likely match is identified and reported, a list (e.g., a minimized list)

of matches is identified and reported, or that an indication of no matching (e.g., no matching beyond a match threshold) is reported. For example, a pilot attempting to select a navigation chart a based on an FMS procedure may be presented via the output device 108 three navigation charts with match values that suggest a moderate to high probability that one of the three navigation charts is the correct chart.

Figure 4:
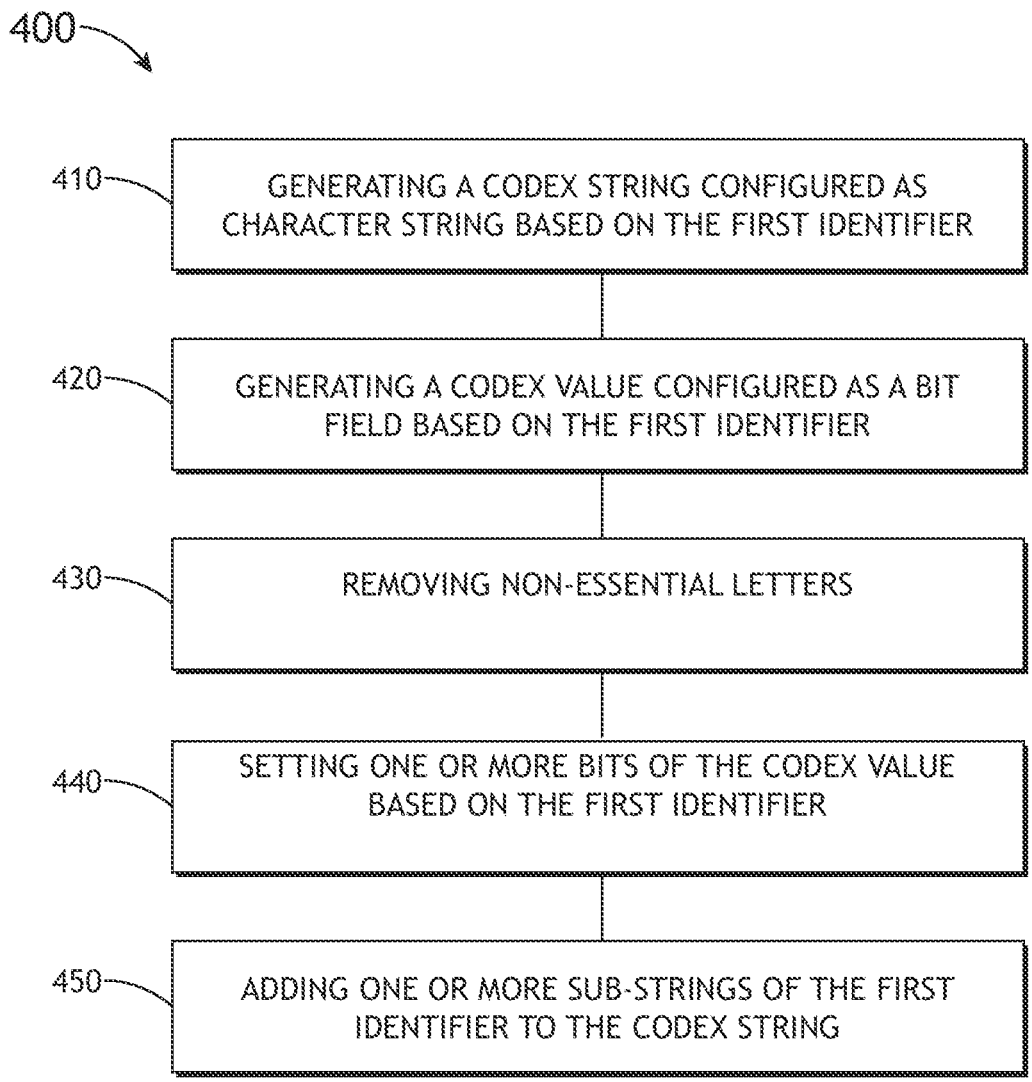
FIG. 4 is a block diagram of a flow chart illustrating a method for converting a first identifier into a first simplified identifier, in accordance with one or more embodiments of the disclosure.

FIG. 4 is a block diagram of a flow chart illustrating a method 400 for converting a first identifier into a first simplified identifier, in accordance with one or more embodiments of the disclosure. The method 400 may include the parsing of the first identifier into one or more data forms, or within one of more data fields. As described herein, a first identifier may already be simplified, or partially simplified, and may not require one or more steps of the method 400.

In some embodiments, the method 400 includes a step 410 of generating a codex string configured as character string based on the first identifier. The codex string may contain moniker names, procedure names, geographical locations, runway numbers, or any other identifying information. The coded string may be configured as any type of data string. For example, the codex string may be defined with a form {N,N,LLL;M;M}, where "N" is defined as zero or more numbers separated by commas, "L" is defined as zero or more letters without separation, and "M" defined as a moniker string of up to four characters preceded by a semicolon. In this form, "N" may indicate specific runway numbers, "L" may indicate procedure variants, and "M" may indicate the names of the monikers represented by the chart. There may be more than one Moniker defined within a chart name.

In some embodiments, the method includes a step 420 of generating a codex value based on the first identifier. The codex value may be configured as a bit field comprising any number or range of bits. For example, the codex value may comprise bits in a range of 16 to 128 bits. In another example, the codex value may comprise bits in a range of 32 to 64 bits. For instance, the codex value may comprise approximately 32 bits. The codex value may include any type of information relating to the first item including but not limited to: type of equipment being used (e.g., Global Positioning System (GPS) equipment, or Instrument Landing System (ILS) equipment), runway positions (e.g., left, center, or right), page number of the chart, and whether the chart name is a "Guidance" type (e.g., such as a GPS chart), or a "Moniker" type (e.g., such as a BENKE7). A codex value chart 500 illustrating an example of a codex value is shown in FIG. 5, in accordance with one or more embodiments of the disclosure.

Figure 6:
FIG. 6 is a chart illustrating a list of letters and words that may be removed from the first identifier, in accordance with one or more embodiments of the disclosure.

In embodiments, the method 400 includes a step 430 of removing nonessential letters. Nonessential letters may include any letters that are either not needed or redundant for correlating the first item for the second item. For example, a list of letters and words may be generated that may be removed from the first identifier. An example list 600 of letters and words to be removed from the first identifier is shown in FIG. 6.

In some embodiments, the method 400 includes at step 440 of setting one or more bits of the codex value based on the first identifier. For example, if the FMS chart is a 'Guidance" chart type (e.g., the chart comprises approach chart, departure chart, arrival chart, or airport chart types, and at least one of the following key strings exist as either a word or a substring: ILS, LOC, GPS, TACAN, NDB, DME, VOR, RNP, GNSS, LDA, SDF), then the appropriate bit (e.g., bit zero in FIG. 5) will be set along with the guidance type (e.g., bit 6 in FIG. 5). In another example, bits for SID and STAR will be set (e.g., bit 28-29 in FIG. 5) upon detection of the strings SID/SIDS and STAR, respectively. In another example, bits for X, Y, Z, R (right), C (center), and L (left) (e.g., bits 20-25 in FIG. 5, respectively) will be set depending if the first identifier contains number with letters immediately preceding the number. For instance, the designation 17L in a first identifier will result in the setting of bit 25 in FIG. 5). In another example, for strings within the first identifier that denote paging (e.g., PGn or CONTn, where n is a number) and set the continued bits as appropriate (e.g., bits 30-31 in FIG. 5). In another example, detection of the words "high" or "Hi" in the first identifier will result in the setting of a bit for high airway (e.g., bit three in FIG. 5).

In some embodiments, the method 400 includes a step 450 of adding one or more sub-strings of the first identifier to the codex string. For example, a first identifier than contains a number either written as a numeral (e.g., 7) or spelled out (e.g., seven) will be added to the codex string in a numeral form. In another example, non-codex value-relevant sub-strings are processed and added to the codex string. For instance, when parsing left to right, and a 2-letter sub-string is detected, the sub-string is a moniker if the string itself has not yet been determined to be a moniker (e.g., no unreserved sub-string of more than two letter has been found to the left of the two-letter sub-string). If the string has already been determined to be a moniker, the 2-letter sub-string is a modifier for the moniker and is treated as the individual letters in the codex string. In a particular illustration, "BAYES_AB" indicates the "BAYES" moniker with procedures "A" and "B" while "SL_403_621_DEP" would be treated as a moniker since the two letters, "SL", were processed before finding a moniker. This catches moniker place names that start with "EL", "LA", or "ST". Any remaining moniker strings are added to the codex string, and if are remaining unprocessed strings, the moniker bit will be set in the codex value (e.g., bit 1 in FIG. 5). A codex string may have both guidance and moniker characteristics.

Figure 7:
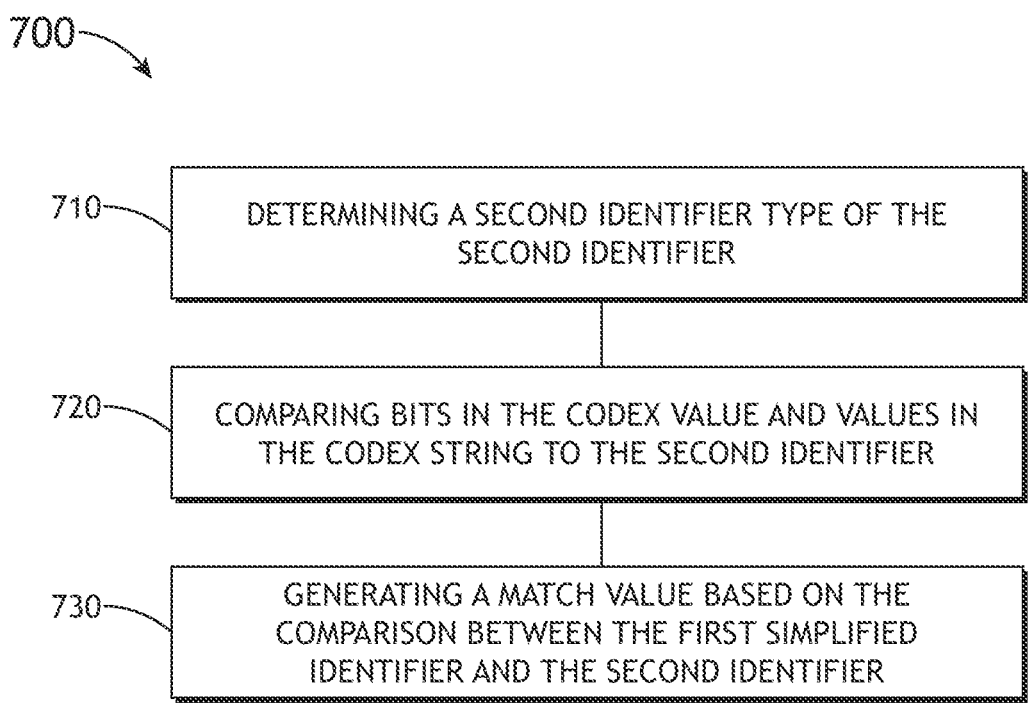
FIG. 7 is a block diagram of a flow chart illustrating a method for executing a matching procedure configured to match the first simplified identifier to the second simplified identifier, in accordance with one or more embodiments of the disclosure.

FIG. 7 is a block diagram of a flow chart illustrating a method 700 for executing a matching procedure configured to match the first simplified identifier to the second identifier, in accordance with one or more embodiments of the disclosure. Once generated, the first simplified identifier provides a more straightforward approach for correlating the first item to the second than the non-simplified first identifier.

In some embodiments, the method 700 includes a step 710 of determining a second identifier type of the second identifier. For example, one or more characteristics of the second identifier may be used to determine the second identifier type, which then determines whether to perform a matching procedure, or which specific matching procedure is appropriate. For instance, if the second identifier is identified as a guidance procedure, then a procedure specific for matching a guidance procedure to the first simplified identifier will be performed. In another instance, if the second identifier is identified as a moniker, then a procedure specific for matching a moniker to the first simplified identifier will be performed. In a particular illustration, an FMS procedure (e.g., the second identifier) will be identified as a guidance procedure if the second procedure contains any of the following: a letter followed by two numbers, and/or a combination of numbers that includes "TTAC", "EVOR", "SVOR: "FNDB", and/or "GGPS". If a procedure is not a guidance procedure, then it is a moniker.

In embodiments, the method 700 includes a step 720 of comparing bits in the codex value and values in the codex string to the second identifier. For example, utilizing the one or more processors 110, the system 100 may compare an FMS procedure (e.g., or an FMS International Civil Aviation (ICAO) procedure, or an FMS procedure type, and match it to a chart name (e.g., the first simplified identifier). For instance, a procedure will only match to a chart if both the procedure and the chart are of the same type (e.g., guidance or moniker) and include the same airport.

In embodiments, the method includes a step 730 of generating a match value based on the comparison between the first simplified identifier and the second identifier. The match value may be any parametric or nonparametric value system that facilitates the grading or placement of a comparison between the first simplified identifier and the second identifier. Once generated, the match value may be used to determine which comparisons, and therefore which first item may be reported as a potential match. The values or levels within the match value may include known value systems. For example, the match values may include and exact match, a close match, a possible match, and no match.

The following description details an example set of rules for generating match values between a first simplified identifier (e.g., a processed chart name) and a second identifier (e.g., a procedure name, such as an FMS procedure name). The rules differ slightly between guidance-related matching and moniker-related matching. In general, guidance matching follows a set of rules which takes the first letter of the FMS procedure name (or possibly a specific embedded string within the FMS procedure name) and matches it to a guidance type bit in the codex value. Additional matching is done against positional type information (left right, center, and others), runway IDs, version of chart (X, Y, Z for FAA charts but random other letters for some foreign charts), and other information. Moniker matching is performed as a comparison between the procedure string (e.g., the FMS procedure name) and the moniker sub-strings stored in the codex string. Additional matching is done with version numbers, version of procedure letters, and other information.

For example, an exact match between a chart name and a guidance procedure name is determined when 1) the guidance bit in the codex value is set, 2) an FMS embedded runway identification (ID) number matches a runway ID in the codex string, 3) there is a match on the first letter of the procedure name to the associated codex value bit (e.g., see FIG. 8), and 4) no additional letters are found in the procedure name or additional procedure name letters are found in the codex string or there is a match between additional letter in the FMS procedure name and the codex value bit (e.g., see chart 800 in FIG. 8).

In another example, a close match between a chart name and a guidance procedure name is determined when the first three conditions of the exact match criteria are met, but not the fourth criteria, or 1) the guidance bit in the codex value is set, 2) the FMS embedded runway ID number matches a runway ID in the codex string, and 3) there is a match on the first letter of the procedure name associated codex values "G" and "R" (e.g., codex bits for GPS and required navigation performance (RNP)) as shown in FIG. 8.

In another example, a possible match between a chart name and a guidance procedure name is determined when 1) there is a single chart at the ICAO that matches the FMS procedure name (e.g., guidance chart type), 2) the FMS procedure type is "departure" and the SID bit is set in the codex value and the FMS runway ID is found in the codex string, or 3) the FMS procedure type is "arrival" and the STAR bit is set in the codex value, and the FMS runway ID is found in the codex string.

In another example, an exact match between a chart name and a moniker procedure name is determined when 1), the moniker bit in the codex string is set, 2) the first characters of the FMS procedure name match the first characters of a moniker sub-string in the codex string, 3) either a) no numbers exist in the FMS procedure name or b) a number in the FMS procedure name matches a number in the codex string, or c) a number exists in the FMS procedure name and no numbers exist in the codex string, and 4) either if the FMS procedure name has an additional associated letter, the codex string also has the same additional associated letter or an equivalent bit set in the codex value if the letter is "X", "Y", or "Z".

In another example, a close match between a chart name and a moniker procedure name is determined when the moniker bit in the codex value is set and 1) the first characters of the FMS procedure name match the first characters of a moniker in the codex string, 2) two characters in the FMS procedure name match two characters in a moniker in the codex string and there is a number in the FMS procedure name that matches an associated number in the codex string, 3) the FMS procedure type is "departure" and the FMS runway ID exists in the codex string and the SID bit is set in the codex value, or 4) the FMS procedure type is "arrival" and the FMS runway ID exists in the codex string and the STAR bit is set in the codex value.

In another example, a possible match between a chart name and a moniker procedure name is determined when 1) the FMS procedure type is "departure" and the FMS runway ID does not exist in the codex string and the SID bit is set in the codex value, 2) the FMS procedure type is "arrival" and the FMS runway ID does not exist in the codex string and the STAR bit is set in the codex value, 3) a number exists in the FMS procedure name, no numbers in the codex string, and at least two letter can be matched, in order, between the FMS procedure name and a moniker sub-string in the codex string, or 4) there is a single chart of the FMS procedure type for the ICAO.

In some embodiments, the second identifier is configured as a second simplified identifier. For example, the second identifier may be converted similarly to that of the first identifier such that the converted, or simplified, second identifier is configured with a second codex value and a second codex string. Once converted, the second identifier, now simplified, may be matched with the first simplified identifier, and a match value calculated.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method for correlating a first item to a second item comprising:
   detecting a first identifier associated with the first item, wherein the first identifier comprises a chart name;
   detecting a second identifier associated with the second item, wherein the second identifier comprises a procedure name;
   simplifying the first identifier, wherein simplifying the first identifier comprises removing nonessential letters;
   determining one or more chart name types from chart name, wherein the one or more chart name types comprises a moniker type or a guidance type;
   generating a codex string based on the first identifier;
   generating a bit field comprising a codex value based on the first identifier, wherein the codex value comprises at least one bit of the bit field designating the one or more chart types;
   determining if the procedure name type is a guidance type or a moniker type;
   determining if the chart name type of the first identifier is equivalent to the procedure name type of the second identifier;
   in response to a determination that the chart name type of the first identifier is equivalent to the second identifier, comparing bits in the codex value and values in the codex string of the first identifier to the second identifier and
   generating via a flight management system (FMS) computing device a match value between the first identifier and the second identifier based upon a comparison between the bits in the codex value and the values in the codex string of the first identifier with the second identifier; and
   reporting a list of matches between one or more first items and one or more second items onto an FMS display, wherein the list reports a correlation between the one or more first items and the one or more second items based on the match value.

2. The method of claim 1, wherein the first item and the second item are configured as electronic files.

3. The method of claim 1, wherein the codex string comprises a geographic location.

4. The method of claim 1, wherein simplifying the first identifier is performed in a non-mobile computing environment.

5. The method of claim 1, wherein the second identifier is simplified.

6. A system comprising:
   a controller coupled to and aircraft and configured to correlating a first item to a second item comprising:
      one or more processors; and
      a memory configured to store data and instructions executable by the one or more processors, wherein the instructions include:
         detecting a first identifier associated with the first item, wherein the first identifier comprises a chart name;
         detecting a second identifier associated with the second item, wherein the second identifier comprises a procedure name;
         simplifying the first identifier, wherein simplifying the first identifier comprises removing nonessential letters;
         determining one or more chart name types from chart name, wherein the one or more chart name types comprises a moniker type or a guidance type;
         generating a codex string based on the first identifier;
         generating a bit field comprising a codex value based on the first identifier, wherein the codex value comprises at least one bit of the bit field designating the one or more chart types;
         determining if the procedure name type is a guidance type or a moniker type;
         determining if the chart name type of the first identifier is equivalent to the procedure name type of the second identifier;
         in response to a determination that the chart name type of the first identifier is equivalent to the second identifier, comparing bits in the codex value and values in the codex string of the first identifier to the second identifier and
         generating via a flight management system (FMS) computing device a match value between the first identifier and the second identifier based upon a comparison between the bits in the codex value and the values in the codex string of the first identifier with the second identifier; and
         reporting a list of matches between one or more first items and one or more second items onto an FMS display, wherein the list reports a correlation between the one or more first items and the one or more second items based on the match value.

7. The system of claim 6, wherein the first item and the second item are configured as electronic files.

8. The system of claim 6, wherein the second identifier is simplified.

9. The method of claim 1, wherein determining a guidance type of a chart name type comprises:
   determining if the first item is at least one of an approach chart, a departure chart, an arrival chart, or an airport chart; and
   determining if the chart name includes at least one of "ILS", "LOC", "GPS", "TACAN", "NDB", "VOR", "RNP, "GNSS", "LDA" or "SDF" as a word or a substring.

10. The method of claim 9, wherein determining a guidance type of a procedure name type comprises determining if the procedure name includes at least one of the letter groups "TTAC", "EVOR", SVOR", "FNDB", "GGPS" or a letter followed by two numbers.

* * * * *